United States Patent Office 3,421,157
Patented Jan. 7, 1969

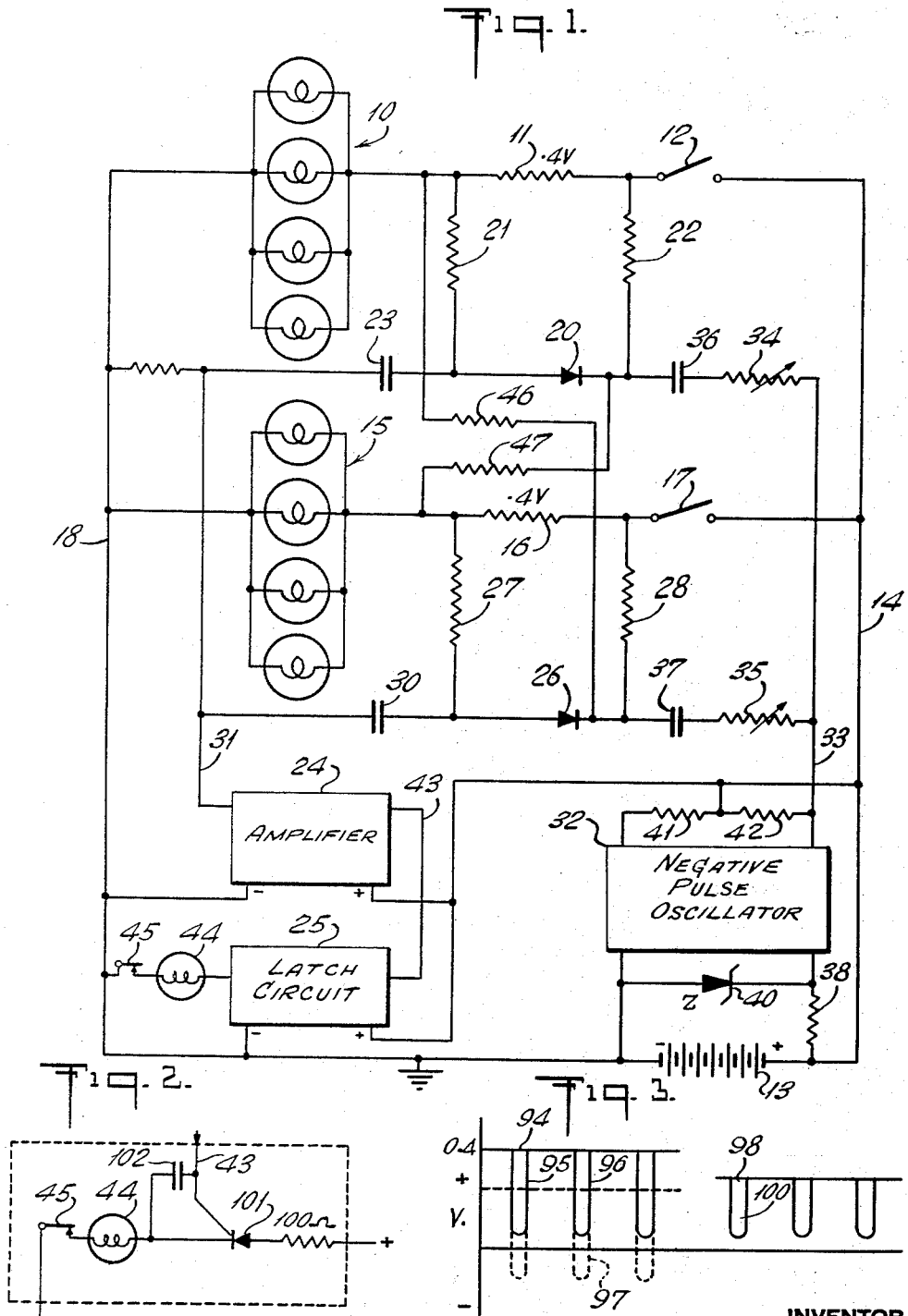

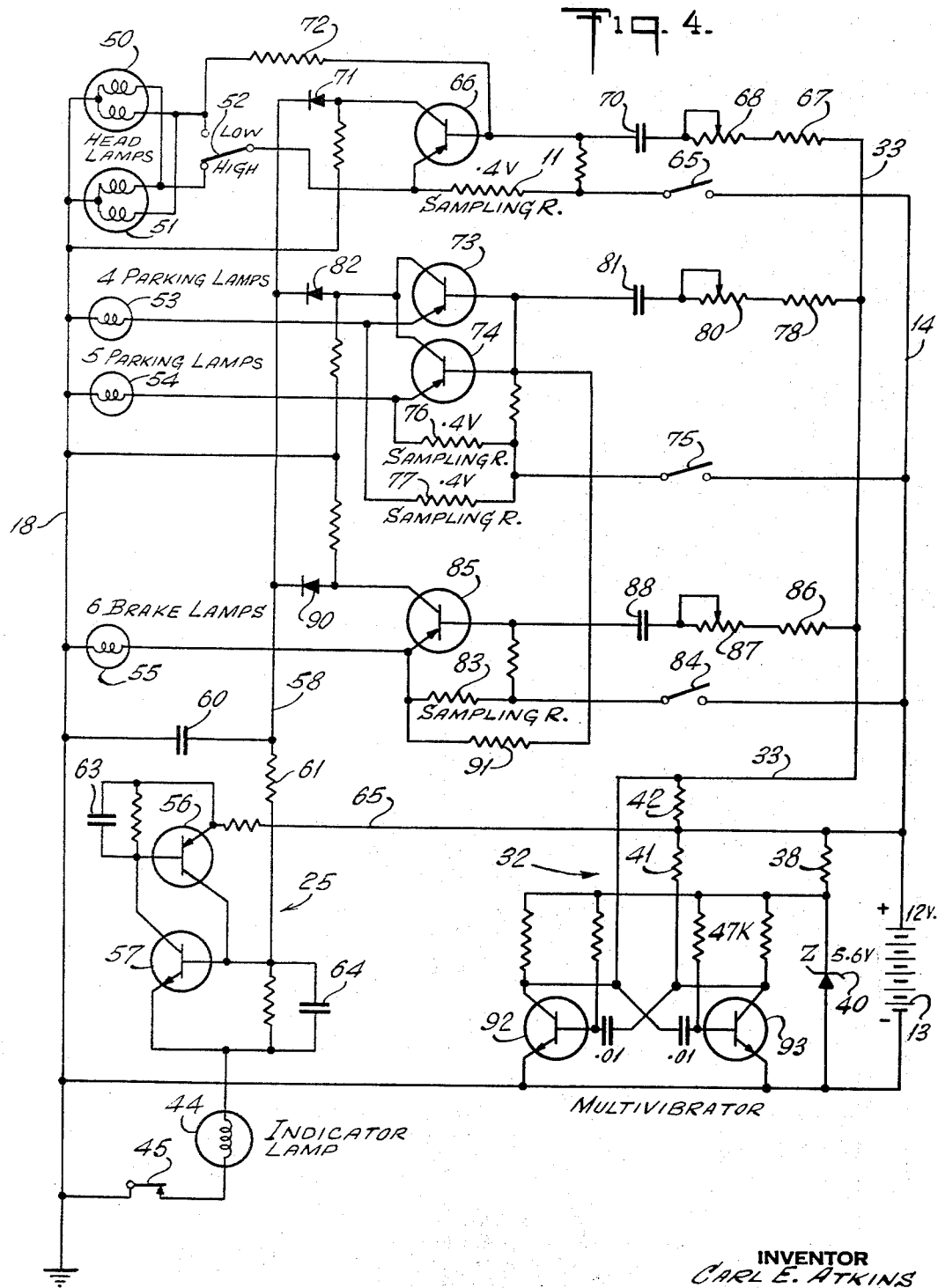

3,421,157
LAMP OUTAGE DETECTOR
Carl E. Atkins, Montclair, N.J., assignor, by mesne assignments, to Wagner Electric Corporation, South Bend, Ind., a corporation of Delaware
Filed Jan. 24, 1966, Ser. No. 522,618
U.S. Cl. 340—251    10 Claims
Int. Cl. G08b 21/00; B60q 1/02

This invention relates to a lamp outage circuit for determining when certain lamps which should be lighted do not take current. The invention has particular reference to a detector circuit when applied to a plurality of lamps which are supplied by a storage battery or some other source of electrical power which may vary considerably in potential. The invention also relates to a detector circuit applied to a system of lamps which may be switched on or off in varying combinations, thereby changing the current carried by the supply conductors.

Lamp outage indicators are fairly common in some lighting installations, particularly when the lamps are in a position which cannot be seen by an operator or inspector. In most cases, the indicating means which shows whether or not a distant lamp is lighted is a relatively simple circuit and may consist of a low resistance in series with the supply conductors and some indicating means bridged across the resistor. The present invention is directed specifically to a group of lamps on an automobile and in this application there are many unusual conditions which require additional circuit arrangements in order to give a true indication of a non-functioning lamp. The electrical system supplying the lamps may vary between 10 and 15 volts and the battery current may vary considerably when, for example, the headlight lamps are switched from high beam to low beam. Also, the turn indicator comprises lamps which are flashed on and off. In addition, the lamps change their current and voltage values during their useful life and this factor must be taken into account when the circuit constants are determined.

The present invention is adjusted so that all the above listed variations are accounted for and an indicator lamp positioned on the automobile dash board in view of the operator lights only when an automobile lamp has burned out, is loose in its socket, or has been removed. While this circuit is specifically designed for automobile use, it is obvious that it may be used in many other circuit applications.

One of the objects of this invention is to provide an improved lamp outage circuit which avoids one or more of the disadvantages and limitations of prior art circuits.

Another object of the invention is to provide a lamp indicator which will give an indication of a burned-out lamp even though the power supply varies between 10 and 15 volts.

Another object of the invention is to provide an indicating circuit which is adjusted for flashing lamps.

Another object of the invention is to provide an indicator device with a compensating circuit which compensates for switching on and off of brake lamps and for switching the headlights from high to low beam.

Another object of the invention is to provide a latch circuit so that the indicator lamp, which indicates a burned-out lamp, will remain lighted after the indicator circuit has provided a pulse which lights it.

The invention comprises a lamp outage circuit which includes a plurality of sampling resistors connected in series with each group of lamps. Voltage sensing means connected across the sampling resistors are connected through isolating diodes to a latch circuit and an indicator lamp for indicating a disabled lamp. A pulse oscillator is provided for applying a plurality of negative pulses to the sampling resistors for overriding the direct current potential drop. A capacitor-resistor circuit is connected in series between the sampling circuit and the latch circuit for eliminating direct current. Transfer circuits are provided between one side of each group of lamps and the bias circuit of a semiconductor diode in series with another group of lamps. Amplifier means are connected between a sensing circuit and a latch circuit which operates to turn on an indicator lamp and to keep it lighted whenever the voltage sensing circuit indicates a reduced direct current due to lamp failure.

For a better understanding of the present invention, together with other and further objects thereof, reference is made to the following description taken in connection with the accompanying drawings.

FIG. 1 is a schematic diagram of connections showing one form of the detector circuit.

FIG. 2 is a wiring diagram showing one form of a semiconductor latch circuit.

FIG. 3 is a graph indicating the voltages which exist across the sampling circuit.

FIG. 4 is another schematic diagram of connections of the detector circuit showing the details of the negative pulse oscillator and the details of an alternate form of latch circuit. In this circuit, transistors are used instead of diodes and there is no amplifier circuit between the transistors and the latch circuit.

Referring now to FIG. 1, a first group of lamps 10 is connected in series with a first sampling resistor 11, an on and off switch 12, and a source of direct current power 13 by means of a positive conductor 14. A second group of lamps 15 is connected in a similar manner in series with a sampling resistor 16, and an on and off switch 17. The other terminals of the lamp groups are connected to a common conductor 18 and the negative terminal of battery 13 which may be grounded. Conductors 14 and 18 may be relatively long and have a finite distributed resistance which is small but not negligible.

Sampling resistor 11 is coupled to a diode 20 by means of two resistors 21 and 22. The anode of diode 20 is connected to a capacitor 23, an amplifier circuit 24, and a latch circuit 25. Capacitor 23 is for eliminating the direct current potential which exists across sampling resistor 11 and for passing only alternating current pulses. The sampling resistor 16 is coupled in a similar manner to a diode 26 by means of resistors 27 and 28. A capacitor 30 acts in the same manner as capacitor 23 to eliminate the direct current potential which exist across resistor 16. The other side of capacitor 30 is connected to conductor 31 which is connected to the input circuit of amplifier 24.

A negative pulse oscillator 32 is provided for applying a series of negative pulses to conductor 33 and both sampling resistors. In series with each of these circuits is an adjustable resistor 34, 35 and a capacitor 36, 37 which prevents the direct current supplied by the battery from flowing into the oscillator 32. The negative pulse oscillator 32 is connected across battery 13 in series with a resistor 38 with its input terminals bridged by a Zener diode 40. The combination of the Zener diode 40 and resistor 38 maintains a regulated voltage across the oscillator supply circuit even though the voltage of the battery may vary over an extended range. Under these conditions, the output of the oscillator would then provide a series of regulated negative pulses of constant amplitude. However, it is desired to produce output pulses which do vary in amplitude by a predetermined amount and for this reason a shunt circuit comprising resistors 41 and 42 are connected as shown so that when the voltage of the battery is reduced, the amplitude of the pulses is also reduced. This type of regulation will be explained in detail hereinafter.

The amplifier 24 may be any type of alternating current amplifier. Its output conductor 43 is connected directly to the latch circuit 25. Both the amplifier and the latch circuit are provided with sources of potential for their operation. As shown in FIGS. 1 and 4, this source of potential is battery 13. When the latch circuit is operated, an indicator lamp 44 is lighted. This lamp remains lighted until switch 45 is opened. The latch circuit is arranged so that the opening of switch 45 returns the latch circuit 25 to its original unoperated condition. The latch circuit may be a silicon controlled rectifier circuit as shown in FIG. 2 or it may be a double transistor arrangement as shown in FIG. 4. A relay may also be used with a locking pair of contacts but the semiconductor circuits are preferred because this type of circuit is primarily designed for use on automobiles, trucks, and other vehicles which may be subject to considerable vibration.

The operation of this type of circuit is as follows:

When a group of lamps 10 is lighted by closing switch 12, the battery 13 sends current over conductor 14, through switch 12, sampling resistor 11, thereby lighting the lamps 10. The return current flows over conductor 18 to the other side of the battery. Sampling resistor 11 is adjusted in value so that when normal current is flowing through it to light all the lamps, the potential across the resistor 11 will be some predetermined amount, such as 0.4 volt. This voltage is a direct current voltage and is applied to diode 20 through resistors 21 and 22. However, there is no current flow provided by this circuit through diode 20 since it is connected in the reverse direction. The potential difference across sampling resistor 11 merely back-biased the diode and thereby prevents negative pulses from flowing through the diode unless the pulses are greater than 0.4 volt or unless the biasing voltage across the sampling resistor is less than this amount. The latter condition is obtained when one or more of the lamps in group 10 fail to pass current for any reason. Then the back-bias on the diode 20 is reduced and the negative pulse oscillator 22 can send pulses over conductor 33 through resistor 34 and capacitor 36, overriding the back-bias of the diode 20, passing through capacitor 23, and then to the input circuit of amplifier 24 by means of conductor 31. The output pulses from amplifier 24 operate latch circuit 25 and light the indicator lamp 44. This indicates that one of the lamps 10 does not carry current and does not provide any light.

A second group of lamps 15 is connected in an identical circuit having a sampling resistor 16, a switch 17, and the same supply conductors. The sampling resistor 16 is coupled to diode 26 which it back-biases in the same manner as the first circuit applied a bias to diode 20. The oscillator 32 is connected through a similar circuit which includes a resistor 35, a capacitor 37, diode 26, and capacitor 37, diode 26, and capacitor 30. The action is the same as that described in connection with the first group of lamps and the first detector circuit.

Now let it be assumed that switch 12 is first closed sending a certain amount of current from battery 13 over conductor 14, through the sensing circuit, and the lamps. This produces the 0.4 volt necessary for the proper back-biasing of diode 20. Now let it be asumed that switch 17 is closed. If this switch were operated alone, the same type of bias would be applied to diode 26 but, with both switches closed and both groups of lamps 10 and 15 drawing current, the voltage drop in each of conductors 14 and 18 is twice as much as previously and the battery 13 has twice the internal voltage drop. If there is no compensating circuit, the resultant reduction in current in each sampling resistor produces a reduction in voltage drop across the sampling resistors 11 and 16 and the back-bias on both diodes 20 and 26 would thereby be reduced and the negative pulses from oscillator 32 could then override the bias on both the diodes and operate the latch circuit, thereby indicating that one of the lamps was not carrying current. As explained above, the circuit is arranged so that any one of the diodes 20 or 26 will pass A.C. pulses to indicate an error when its bias is reduced.

A compensating set of circuits is connected between the two groups of lamps so that the above described erroneous indication will not occur. A first compensating resistor 46 is connected between the positive terminal of the lamps in group 10 and the cathode of diode 26. A similar resistor 47 is connected between the positive terminal of the lamps in group 15 and the cathode of diode 20. When the first group of lamps 10 receives current through closed switch 12, and switch 17 is open, no current passes through resistor 46 and the back-bias voltage applied to diode 20 is substantially the same as the potential drop across sampling resistor 11. Now, if switch 17 is closed and the potential drop in each of conductors 14 and 18 is increased substantially, the voltage at the positive terminal of the second group of lamps is increased substantially. This is due entirely to the passage of current through the second group of lamps 15. Under these conditions, resistor 47 increases the back-bias on diode 20 by supplying an increase in voltage to the diode cathode. By adjusting the value of resistor 47, switching on the second group of lamps 15 has substantially no effect on the reverse bias of diode 20. The compensating circuit which includes resistor 46 has the same effect on the reverse bias of diode 26 when switch 12 is opened and closed as the compensating circuit which includes resistor 47 had on the reverse bias of diode 20.

Referring now to FIG. 4, a circuit is shown which is substantially the same as a circuit which may be applied to an automobile or a truck. Two head lamps 50 and 51 are shown, each with a filament for a high beam and a low beam. A switch 52 is included in this circuit for switching beams. There are two groups 53 and 54 of parking lamps and one group 55 of six brake lamps, some of these lamps including the directional lamps which are flashed on and off to designate an intended turn to the right or left. In this circuit, no amplifier is necessary because the diodes shown in FIG. 1 have been replaced by transistors which contain the characteristics of the diodes and, in addition, provide amplification of the sensing current.

The latch circuit 25 is shown in detail and includes two transistors 56 and 57. These transistors are coupled to each other so that the collector of each transistor is connected to the base electrode of the other transistor. This combination forms a semiconductor latching arrangement which normally passes no current but which, when activated by a negative potential, will pass current until a portion of its circuit is broken. The input of the latch circuit is supplied over conductor 58 while the output is connected directly to indicator lamp 44, switch 45, and the negative conductor 18. The input conductor 58 is connected to a capacitor 60 and a series resistor 61, these components forming a filter which removes the alternating current components of the pulse train and presents only a direct current voltage to the base of transistor 57. There are transients generated in this system which may trigger the latching circuit when it should not be activated. These transients may be produced by switching the high current head lamps or other components fed by the battery 13. In order to absorb these variations, a large capacitor 63 is bridged across the base and emitter electrodes of transistor 56. Other normal variations are supplied by the flashing lamps which are included in the group of six brake lamps. The rate of flashing of these lamps is sufficiently high so that a second capacitor 64, bridged across the base and emitter electrodes of transistor 57, provides a delay so that the flashing currents do not produce an actuation of the latch circuit. When the latch circuit is activated, current from battery 13 supplied by conductor 65 passes through the emitter and collector electrodes of transistor 56 and biases the base of transistor 57 so that it conducts and biases the base of transistor 56. This condition applies current to the indicator lamp 44 which remains lighted until switch 45 is opened.

Referring now to the detector circuit for the head lamps 50 and 51, switch 65 applies the battery voltage from conductor 14 to the lamps in series with the sampling resistor 11. As described above, in connection with FIG. 1, the value of this resistor is chosen so that normal current passing through the lamps produces a voltage drop of a predetermined value, in this case 0.4 volt. This voltage is applied to the emitter and base electrodes of a transistor 66 resulting in a reverse bias so that current will not flow in the collector circuit. At the same time, a series of negative pulses is applied over conductor 33 in series with resistors 67 and 68 and capacitor 70 to the base of transistor 66. As before, the amplitude of these negative pulses is somewhat less than 0.4 volt and nothing happens. However, if one of the head lamps should burn out or be disconnected, the potential difference across the sampling resistor is then reduced so that the negative pulses override the reverse bias and current is supplied by the resistor through an isolation diode 71 to conductor 58 and the latching circuit. This current activates the latching circuit and lights the indicator lamp 44.

Now, let it be assumed that switch 52 is operated to turn off the high beams and turn on the low beams. Since the low beam filaments take considerably less current than the high beam filaments, the sampling resistor now has a reduced potential difference which might be overridden by the negative pulses from oscillator 32. However, a compensating circuit which includes resistor 72 is connected between the positive terminal of the low beam filaments and the base of transistor 66 and when the low beam filaments are supplied with current, their potential drop is increased and the potential of the base of transistor 66 is also increased, thereby adjusting the bias of the transistor and preventing a current flow through diode 71.

The modern automobile contains nine parking lamps. For reasons which will be discussed hereinafter, these lamps are divided in two groups 53 and 54 and each is connected to its own sensing circuit which includes transistors 73 and 74. Current is supplied from the battery and conductor 14 through switch 75 and two sampling resistors 76 and 77, each sampling resistor connected respectively to one of the groups. Negative pulses from oscillator 32 are supplied over conductor 33 to the bases of transistors 73 and 74 through series connected resistors 78 and 80 and capacitor 81. The action of this circuit is the same as the action of the headlight circuit as, when one of the lamps does not carry current, there will be a reduction in the potential difference across one of the two sampling resistors 76 or 77 and negative pulses will be sent through diode 82 to the latching circuit.

The six brake lamps 55 are connected as a group through sampling resistor 83, switch 84, and conductor 14 to the battery. Also, the oscillator 32 is connected to the base of another transistor 85 in series with resistors 86 and 87 and capacitor 88. When one of the brake lamps is extinguished or fails to carry current when switch 84 is closed, current is sent through diode 90 to operate the latching circuit. Switching on the brake lamps 55 may lower the voltage on conductor 14 and, for this reason, a compensating circuit including resistor 91 is connected between the positive terminal of the brake lamps and the bases of transistors 73 and 74. This provides the additional potential drop necessary to prevent an error indication.

The oscillator 32 is shown in FIG. 4 as a transistor astable or free-running multivibrator containing two transistors 92 and 93. The usual coupling circuits are provided so that this oscillator produces a series of negative pulses on conductor 33. In one embodiment of this circuit, a frequency of about 4,000 cycles per second is produced but this frequency is not critical and it may be varied over a wide range. As described above, a voltage regulator circuit comprising a Zener diode 40 and a series resistor 38 are provided to maintain a constant voltage of about 5.6 volts for the collector and base supply circuits. Under these conditions, the oscillator would produce a constant voltage output but this is not desirable because when the voltage of battery 13 is varied, the voltage across the sampling resistors is also varied. The output of the oscillator must be varied in a like manner or an error signal will be sent to the latch circuit.

FIG. 3 is a graph designed to illustrate the operation of the oscillator pulses. Under normal conditions, with the battery voltage at 12 volts, the direct current voltage drop across sampling resistor 11 is 0.4 volt and is represented by line 94. The negative pulses 95 are superimposed on this voltage and have an amplitude which is somewhat less than 0.4 volt so the pulses cannot pass through the transistor-emitter junction. If one of the headlight lamps fails to pass current, the potential drop across the sampling resistor is lowered to a value represented by the dotted line 96 and then the negative pulses 97 override the transistor junction bias and operate the latch circuit.

The battery voltage may fall below its average of 12 volts and, when it does, the potential drop across the sampling resistor falls to a voltage represented by line 98. The amplitude of the negative pulses is then automatically adjusted to be less than the reduced potential drop so that no error signal is transmitted. This adjustment is made by connecting two shunt circuits, each connected to the positive terminal of the battery and terminating at one of the collector electrodes of transistors 92 and 93 (FIG. 4). Each of these circuits contains a resistor 41, 42. Under normal conditions, when the battery is at 12 volts, the shunt circuits provide some additional current to the collectors. When the battery voltage falls below its normal value, the current supplied through resistors 41 and 42 also falls and the pulse amplitude is reduced. The amount of the amplitude change is adjusted by adjusting the value of resistors 41 and 42.

In FIG. 4 the nine brake lamps are divided into two groups 53 and 54 of four and five lamps. Each group is connected through its own transistor 73 and 74 and each group has its own sampling resistor. Under standard conditions, two groups are not necessary because the detection system as described can easily record a single lamp burn-out in a single group of nine similar lamps. However, some allowance must be made for variation in lamp manufacture, aging, and temperature. The use of two groups instead of one permits larger tolerances in the components used and in the voltage pulses generated.

In the above description, the outage detector circuit has been described as applied to the lamps of an automobile or truck. It is evident that the detector circuit can be used in connection with any group of lamps or other electrical loads. A failure of one lamp or load in any group can be indicated at a distant location.

The foregoing disclosure and drawings are merely illustrative of the principles of this invention and are not to be interpreted in a limiting sense. The only limitations are to be determined from the scope of the appended claims.

I claim:

1. A lamp outage detector for providing a signal when any one of a group of lamps does not pass current when electrical power is applied comprising; a first group of lamps; a second group of lamps; a source of direct current power connected to said groups by respective switches; a first sampling resistor connected in series with the source of power and the first group of lamps; a second sampling resistor connected in series with the source of power and the second group of lamps; a semiconductor diode coupled to each sampling resistor by a coupling circuit which applies a reverse bias to the diode; an alternating current oscillator connected to each of said diodes for applying negative pulses thereto, said pulses normally having amplitudes which are less than the reverse bias on the diode; a latch circuit coupled to said diodes for actuation when a lamp in any one of said groups fails to pass current when its switch is closed; and in indicator means connected to said latch circuit for giving an indication when said latch circuit is operated.

2. A detector as claimed in claim 1 wherein said latch circuit includes two transistors each having its base respectively connected to the collector of the other transistor.

3. A detector as claimed in claim 2 wherein said latch circuit includes a capacitor connected between the latch input circuit and the emitter of one of said transistors for delaying the operation of the latch circuit by at least one-quarter of a second.

4. A detector circuit as claimed in claim 1 wherein said diodes are replaced by transistors, one end of each sampling resistor being connected respectively to the emitter of the associated transistor, and the collector of the transistor being coupled to the latch circuit.

5. A detector circuit as claimed in claim 4 wherein each collector of each of said transistors is coupled to the latch circuit in series with a semiconductor diode.

6. A detector circuit as claimed in claim 1 wherein a voltage regulating circuit is connected to said oscillator for varying the amplitude of the negative pulses in accordance with the voltage of said source of direct current.

7. A detector as claimed in claim 1 wherein a transfer circuit including a series resistor is connected between the positive side of each group of lamps and the cathode of the diode coupled to the other group of lamps for altering the back bias on the other group of lamps when the first group of lamps is switched on and off.

8. A detector as claimed in claim 1 wherein said oscillator is a free-running multivibrator including two transistors.

9. A detector as claimed in claim 1 wherein said latch circuit includes a silicon controlled rectifier.

10. A detector as claimed in claim 1 wherein said latch circuit includes an electromagnetic relay having a holding circuit.

References Cited

UNITED STATES PATENTS 3,143,729   8/1964   Power _____ 340—251 XR
3,252,157   5/1966   Pabst _____ 340—251 XR JOHN W. CALDWELL, *Primary Examiner.*

D. MYER, *Assistant Examiner.*

U.S. Cl. X.R.

315—82